Patented June 14, 1949

2,472,897

UNITED STATES PATENT OFFICE 2,472,897

XYLYL TRICHLOROTHIOLACETATE

Alban Thomas Hallowell, Wilmington, Del., assignor to E. I. du Pont de Nemours & Company, Wilmington, Del., a corporation of Delaware No Drawing. Application September 19, 1945, Serial No. 617,441

1 Claim. (Cl. 260—455)

This invention relates to thiol esters of trichloroacetic acid and to their preparation and is a continuation-in-part of my copending application Serial No. 565,803, filed November 29, 1944, now abandoned.

This invention has as an object the preparation of esters of trichloroacetic acid with thiophenols. A further object is the provision of a process whereby esters of trichloroacetic acid and a variety of thiophenols containing one or more thiol groups attached to the aromatic nucleus may be obtained by commercially practicable means. Other objects will appear hereinafter.

These objects are accomplished by the following invention wherein trichloroacetyl chloride is reacted with a thiophenol or a salt thereof.

In the preferred method of carrying out the process of this invention the thiophenol and an equivalent amount of pyridine are dissolved in benzene. Trichloroacetyl chloride is added gradually to the mixture with agitation. Pyridine hydrochloride precipitates and the product remains in solution. The pyridine hydrochloride is removed by washing, the product solution made neutral, and the product removed therefrom by distillation, crystallization or any other suitable means. The presence of pyridine facilitates reaction but is not necessary. Trichloroacetyl chloride may simply be reacted with the thiophenol salt, or more simply still, trichloroacetyl chloride may be reacted with thiophenol itself.

The more detailed practice of the invention is illustrated by the following examples, wherein parts given are by weight. There are, of course, many forms of the invention other than these specific embodiments.

Example 1

To a solution comprising 200 parts of benzene, 46 parts of a mixture of isomers of thioxylenol and 27 parts of pyridine at room temperature, there was added dropwise with stirring a total of 61 parts of trichloroacetyl chloride over the period of 2 hours. During this time, the reaction became slightly warm (30–35° C.) and a white precipitate formed. This precipitate was probably pyridine hydrochloride. After standing overnight, the mixture was poured into an excess of water and the benzene layer was separated and washed with water. The benzene solution was dried over magnesium sulfate and the benzene removed by distillation under reduced pressure. There was obtained 70 parts of crude xylyl trichlorothiolacetate as a yellow oil. This product was dissolved in 250 parts of petroleum ether and the solution cooled in a "Dry Ice"-acetone bath. The precipitated material was removed by filtration and washed with cold petroleum ether. Upon warming to room temperature, the precipitate was converted to a yellow oil from which residual petroleum ether was removed by warming under reduced pressure. The following analysis was obtained for this material:

Found, S, 10.59%; calculated for $C_{10}H_8OSCl_3$, $S=11.30\%$.

The aromatic trichlorothiolacetates, exemplified by the above xylyl trichlorothiolacetate thus prepared have outstanding advantages as modifiers in the preparation of GR–S (butadiene: styrene synthetic rubber) as illustrated in the following Example.

Example 2

An emulsion was prepared from 45 parts butadiene, 15 parts styrene, 3 parts soap chips, 111 parts water, 0.18 parts potassium persulfate and 0.45 part xylyl trichlorothiolacetate. Polymerization was brought about by heating at 50° C. for 16 hours. The polymer was separated by coagulation. A similar polymerization was effected differing from the above only in that 0.30 part of dodecyl mercaptan was substituted for 0.45 part xylyl trichlorothiolacetate. The two polymeric products were vulcanized by heating for 30 minutes at 153° C. by using the following formulation: 100 parts polymer, 2 parts sulfur, 50 parts "Micronex" carbon black, 2 parts stearic acid, 5 parts zinc oxide, and 1.25 parts 2-mercaptothiazoline. The following table shows the difference in properties of these vulcanizates (A in the table represents the rubber prepared with xylyl trichlorothiolacetate as the modifier and B that prepared with dodecyl mercaptan as the modifier).

| | A | B |
|---|---|---|
| Tensile strength, lbs./sq. in | 2,880 | 2,740 |
| Elongation at break, per cent | 450 | 375 |
| Tear strength, lb./in | 260 | 230 |

When an aliphatic trichlorothiolacetate was used as a modifying agent in the polymerization of styrene-butadiene, an unsatisfactory polymer was obtained. The polymerization was carried out by heating the following emulsion at 40° C. for 20 hours: 45 parts butadiene, 15 parts styrene, 2.4 parts oleic acid, 0.66 part sodium hydroxide (U. S. P.), 0.6 part potassium persulfate, 90 parts water, 0.09 part potassium ferricyanide, and 0.6 part "Daxad 11" (condensation product of formaldehyde and sodium beta-naphthalenesulfonate). Dodecyl trichlorothiolacetate was added to the emulsion in amount of 0.77 parts in one experiment, 1.03 parts in another, and 1.42 parts in a further experiment. The resulting rubbers were obtained on coagulating the emulsion and milling in yields of 36 parts (60%), 38 parts (63%) and 40 parts (67%) respectively. The mill behavior for these rubbers was very poor, and the rubbers showed poor tack. These results can be compared to a rubber obtained in the manner described above except that 0.74 parts dodecyl mercaptan was employed. This rubber was obtained in 93% yield and showed good mill behavior with fair tack.

The aromatic trichlorothiolacetates exemplified by xylyl trichlorothiolacetate are likewise highly effective as vulcanization accelerators as illustrated in the following Example.

*Example 3*

The following formulations were prepared:

| A | Parts |
|---|---|
| GR–S | 100 |
| Sulfur | 2 |
| "Micronex" carbon | 50 |
| Stearic acid | 2 |
| Zinc oxide | 5 |
| Xylyl trichlorothiolacetate | 5 |

| B | |
|---|---|
| GR–S | 100 |
| Sulfur | 2 |
| "Micronex" carbon | 50 |
| Stearic acid | 2 |
| Zinc oxide | 5 |
| 2-mercaptothiazoline | 1.25 |

The optimum conditions for curing these two formulations were employed. These were for A—60 minutes at 153° C. and for B—30 minutes at 153° C. The following table shows the superiority of the vulcanizates in which the aromatic trichlorothiolacetate was employed.

| | A | B |
|---|---|---|
| Tensile strength, lb./sq. in | 3,420 | 2,380 |
| Elongation at break, per cent | 690 | 390 |
| Tear strength, lb./in | 475 | 269 |

It is not intended that this invention shall be limited to the examples listed above. For example, while trichloroacetyl chloride is preferred and is used in Example 1 for preparing the thiophenol ester, trichloroacetic acid itself may be employed, particularly if a suitable means is provided for removing the water formed in the reaction. Similarly, in certain instances it may be possible to employ an ester of trichloroacetic acid and to effect the desired reaction by ester interchange. Thiophenols useful in the preparation of the trichlorothiolacetates of this invention include thiophenol, thionaphthol, p-thiocresol, thiosalicylic acid, xylene mercaptan, and m-benzenedithiol. Two or more thiol groups may be present in the molecule, and one or more may be caused to react by varying the amounts of reactants and the method of mixing. Other groups which are not reactive with trichloroacetyl chloride under the conditions of this reaction may be present in the thiol molecule. These include halogen atoms, nitrile groups, ether groups, etc.

Generally it is preferred to carry out the reaction in the presence of an inert solvent such as an aromatic or aliphatic, including cycloaliphatic, hydrocarbon, or a halogenated derivative of one of these. However, the reaction is by no means restricted to the use of solvents. For example, trichloroacetyl chloride may be added to the thiophenol or the thiophenol to the chloride in the absence of any third material. Pyridine is useful to take up the hydrogen chloride evolved and thereby effects a cleaner, more complete reaction. Excess pyridine may be present to act as a solvent.

The method of mixing the reactants is not critical, and the preferred order of addition depends upon the particular reaction being carried out.

The preferred temperature of the reaction is governed by the stability of the product and by convenience of operation. Generally, in the reaction of trichloroacetyl chloride with the thiophenol salt or a thiophenol in the presence of pyridine, it is desirable to cool the reactants while mixing since considerable heat is evolved. A temperature of 10–60° C. is usually most desirable, but the optimum temperature of certain reactions may fall in the broader range of 0—150° C. In some cases it may be necessary to apply heat.

The products of this invention are useful as pesticides, rubber chemicals, modifiers for polymeric materials, polymerization catalysts, petroleum chemicals, dye intermediates and in a variety of other applications. Their uses as polymerization modifiers and vulcanization accelerators are illustrated above.

The above description and examples are intended to be illustrative only. Any modification thereof or variation therefrom which conforms to the spirit of the invention is intended to be included within the scope of the claim.

What is claimed is:

Xylyl trichlorothiolacetate.

ALBAN THOMAS HALLOWELL.

REFERENCES CITED

The following references are of record in the file of this patent:

UNITED STATES PATENTS

| Number | Name | Date |
|---|---|---|
| 2,090,756 | Hansen et al. | Aug. 24, 1937 |
| 2,212,895 | Allen | Aug. 27, 1940 |
| 2,259,869 | Allen | Oct. 21, 1941 |
| 2,383,055 | Fryling | Aug. 21, 1945 |

OTHER REFERENCES

Auwers et al., "Ber. deutsch. Chem. Ges.," vol. 42, pages 544–545 (1909).

Arndt, "Ber. deutsch. Chem. Ges.," vol. 63B, pages 2390–2393 (1930).

Steinkopf, "Ber. deutsch. Chem. Ges.," vol. 56, pages 1930–1932 (1923).